3,244,714
Patented Apr. 5, 1966

3,244,714
CARBAMOYL PYRIDAZINES
Robert J. Geary, Vero Beach, Fla., assignor to Plant Products Corp., Vero Beach, Fla., a corporation of Florida
No Drawing. Filed Oct. 17, 1962, Ser. No. 231,274
3 Claims. (Cl. 260—250)

This invention relates to the production of novel chemical compounds, and more particularly to novel maleic hydrazide derivatives having plant growth regulating properties, to agricultural chemical compositions containing such derivatives, and to methods for utilizing the same for regulating plant growth.

Increasing use has of late been made of chemicals as plant growth regulants, i.e., for altering the growth characteristics of plants as by temporarily inhibiting plant growth or by destroying certain plants (phytocides or herbicides), or by soil sterilization, prevention of seed germination, etc., or by causing so-called hormone responses such as defoliation of growing plants, promotion of storage stability of crops, causing abscission of fruit and producing male sterile plants (parthenocarpy), etc. Although a number of different chemicals have been previously proposed for such uses, including certain maleic hydrazide compounds, they have been commonly subject to one or more disadvantages, as for example unduly high cost, insufficient activity, instability in storage or use, insufficient or excessive selectivity, inadequate solubility properties, and the like.

It is an object of this invention to provide a group of novel chemicals. Another object of this invention is the provision of such a group of chemicals having plant growth regulating activity which will not be subject to one or more of the above disadvantages. A further object of this invention is the provision of novel agricultural chemical compositions containing as the essential active plant growth regulating component one or a mixture of such novel chemicals. A still further object of this invention is the provision of a method for regulating plant growth employing such novel chemicals and compositions. Other objects and advantages will appear as the description proceeds.

The attainment of the above objects is made possible by my discovery that improved and unexpected plant growth regulating activity is possessed by the product of the reaction of 1 mole of maleic hydrazide with 1 mole of a lower alkyl isocyanate of the formula O=C=N—R$^1$ or with 1 mole of an N-lower alkyl carbamyl chloride of the formula Cl—OC—NR$^1$R$^2$ wherein R$^1$ is lower alkyl of 1 to 4 carbon atoms and R$^2$ is selected from the group consisting of H and lower alkyl of 1 to 4 carbon atoms. Because of the various keto and enol forms in which the maleic hydrazide reactant may exist, the reaction product is a compound or a mixture of two or more of the compounds having the formulae

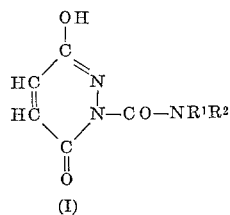

(I)

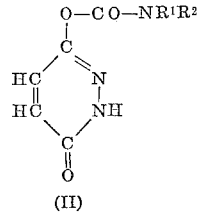

(II)

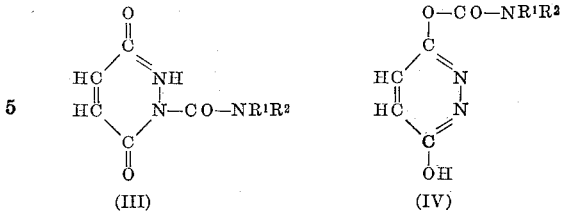

In the above formulae, the lower alkyl radical is preferably methyl, but may be ethyl, propyl, isopropyl, butyl, or isobutyl. It will be understood that when a lower alkyl isocyanate is reacted with the maleic hydrazide, R$^2$ in the reaction product is always H.

In accordance with the above, the products of my invention are prepared by reacting 1 mole of maleic hydrazide with 1 mole of methyl isocyanate, butyl isocyanate or the like, or by reacting 1 mole of maleic hydrazide or an alkali metal salt thereof (sodium, potassium etc.) with 1 mole of N-methyl carbamyl chloride, N-butyl carbamyl chloride, N,N-dimethyl carbamyl chloride, N,N-dibutyl carbamyl chloride, or the like. Preferred for reaction with the maleic hydrazide reactant are methyl isocyanate (or N-methyl carbamyl chloride) and N,N-dimethyl carbamyl chloride.

The reaction between maleic hydrazide and the lower alkyl isocyanate may advantageously be carried out at an elevated temperature of at least about 40° C. For example, the required amounts of maleic hydrazide and lower alkyl isocyanate reactants, the latter desirably in slight molar excess, may be introduced into a high pressure vessel with great excess of air space so that the reaction mixture occupies no more than about 20% of total volume. The mixture is then heated gently, as on a steam bath, to complete the reaction which may in some instances require up to about 4 hours or more. The use of superatmospheric pressures and/or a catalyst such as boron fluoride or dimethylamine, for example in proportions of about 0.05 to 0.2 mole per mole of the maleic hydrazide, may shorten the reaction time somewhat. The resulting reaction mixture is a crude reaction product which may be used for plant growth regulating purposes as is, or after isolation as by gently heating, desirably under vacuum, to distill off the excess lower alkyl isocyanate and/or by adding a limited amount of petroleum ether or hexanol or the like and chilling to precipitate out the desired carbamate compound which may be further purified if desired by recrystallization from n-hexane, ligroin, alcohol, or other solvent. The resulting compounds of the invention are for the most part water insoluble high melting crystalline products at room temperature. They are soluble in such solvents as dimethylformamide, dimethylsulfoxide, cyclohexanone, and the like.

In the above process, it will be understood that the reaction could if desired be carried out at lower temperatures down to room temperature, although this would be commercially impractical because of the unduly long reaction times required. Similarly, depending upon the particular isocyanate reactant, it may in some instances be desirable to carry out the reaction in an inert organic diluent or solvent for one or both of the reactants.

When an N-lower alkyl or N,N-di lower alkyl carbamyl chloride is employed for reaction with the maleic hydrazide, no heat need be generally added since the reaction is exothermic. Provision must be made for removing the HCl formed during the reaction, completion being indicated by cessation of evolution of HCl and/or formation of the desired compounds of the present invention as a crystalline precipitate. The reaction may also be carried out in the presence of an acid-binding agent such as an alkali metal (sodium, potassium, etc.) hydroxide, carbonate, bicarbonate, etc., or using an alkali metal salt of maleic hydrazide, in which case an alkali metal chloride will be formed as a by-product. Relative to the isocyanate reactant, use of the carbamyl chloride reactant requires less time for completion of the reaction.

The reaction products of the present invention are highly effective plant growth regulants and may be applied directly or indirectly to any part of the plant the growth characteristics of which are to be altered. They are relatively better soluble in the waxy tissues of the plants, selectively absorbed into the leaves of the plants, and translocated throughout the system of the plant to exert their growth regulating activity. Alternatively, the compounds of this invention may be employed for inhibiting the germination of plant seeds, or promoting same, by application to the seeds themselves or to the soil in which the seeds have been or are expected to be deposited. It will be understood that because of the great activity of such compounds, they must generally be employed in relatively small amounts, destructive activity requiring use of larger amounts than stimulating activity.

The agricultural chemical compositions of the present invention are prepared by formulating one or a mixture of the above-defined carbamate compounds with a carrier which may be a finely divided solid for use as a dust, or a liquid, for example as a suspension or dispersion in water, as an oil-in-water type emulsion or as a solution in an organic solvent. Desirably, the compositions should contain a surface active agent which may be a dispersing, emulsifying or wetting agent, or a combination thereof.

In the formulation of powders for application as dusts, the defined reaction product is uniformly admixed with a free-flowing particulate dry inert solid carrier which may be organic or inorganic. Examples of such organic carriers include sawdust, the flours derived from soy bean, peach pit, apricot pit, tobacco, walnut shell, wheat, wood, byproduct lignin and lignocellulose, lignin sulfonic acid, urea, cork, and the like. As inorganic carriers, there may be mentioned the silicas such as diatomite, pumicite, and tripolite, carbonates such as calcium bicarbonate and carbonate, calcite and dolomite, silicates such as talc, pyrophillite, mica including vermiculite and the like, various clays such as montmorillonite, saponite, kaolinite, attapulgite, and the like, tricalcium phosphate, boric acid, etc. These powders should preferably have a particle size of about 0.5 to 10 microns, which may be obtained with the usual mixing, blending or grinding equipment, and may generally contain, in addition to the carrier, about 5 to 75% of the active carbamate compound, and desirably about 0.5 to 3% of a wetting agent or dispersing agent or the like, or both. The addition of such agents renders the dust wettable and dispersible, thereby facilitating the application thereof from an aqueous slurry in the field if desired. The ingredients may be simply mixed together thoroughly, or the active compound may be added and mixed in as a concentrated solution in a volatile organic solvent after which the solvent is evaporated off.

The surface-active agents operative in the present compositions are well known, may be anionic, nonionic or cationic, and examples of such agents are fully disclosed in U.S. 2,614,916. Such disclosure in said patent is incorporated herein by reference to avoid needless repetition. In general, wetting agents improve and/or accelerate absorption by and penetration into the plant part, dispersing agents facilitate the production of more uniform and/or stable suspensions of the solid particles of the composition in a liquid, preferably water, and emulsifying agents facilitate the production of more uniform and/or stable emulsions of the present compositions or compounds in organic solvent solution in water as the matrix or continuous phase.

As pointed out above, the carrier may also be a liquid if the active carbamate is to be applied in the form of a spray, or by brushing or impregnation. These liquid formulations may contain the carbamate in dilutions ranging from about 1:10 to 1:3,000 depending upon the liquid diluent, the intended use, and the like. The higher dilutions, as for example dilutions of 1:400 to 1:3,000 are employed in the case of application from aqueous slurries or suspensions or oil-in-water emulsions. In producing the aqueous slurries or suspensions, the above-described wettable powder formulations may be simply dispersed in the required amount of water in the field to produce the desired concentration necessary for spraying. In the production of oil-in-water emulsions, a concentrate of the carbamate compound in an organic solvent therefor, such as petroleum oil and a mutual solvent, may be prepared and made available for sale or immediate use, which concentrate may preferably further contain an oil-soluble oil-in-water type emulsifying agent facilitating emulsification of the concentrate in water for application in the field.

If desired, the above-described solutions of the present carbamate compounds in organic solvent solution may be applied as such, in more or less concentrated form, directly or indirectly to the plant, as for example in a small hand sprayer. In such case, higher concentrations of the order of 1:10 to 1:100 dilution may be employed. If desired, such organic solvent formulations may be prepared in the form of an aerosol in which the active carbamate compound is dispersed in a liquid capable of expanding rapidly into a gas (propellant) to atomize the composition. Such composition may for example contain up to 3% of the active carbamate, up to 10% of a coupling or mutual solvent such as cyclohexane, up to 10% of an oil such as mineral or vegetable oil, which serves to regulate the particle size, if desired, and the remainder a solvent capable of expanding rapidly at ordinary temperatures and pressures to form a gas, as for example a Freon such as dichloro-difluoromethane, or methyl chloride, or other known propellant.

It will be understood that the carbamate compounds of the present invention may be applied in 100% form, but this is impractical because of difficulties in handling, measuring, applying, etc. Formulated compositions as described above are therefore preferred. Regardless of whether the carbamate compounds are applied pure or in formations, routine experimentation will determine the optimum amount and/or concentration required for achieving the desired growth regulating result (i.e. effective amount). It will also be understood that these compositions may contain other functional agents and assistants such as pesticides including insecticides, arachnicides, bactericides, fungicides, and the like, fertilizers, other growth regulants, bonding, spreading and sticking agents, extenders, and the like.

The compounds and compositions of the present invention are highly effective plant growth regulating agents for a wide variety of plant life including both economic plants such as cotton, string beans, corn, peanuts, and the like, and undesirable plants or weeds growing on land or in water. They are especially useful in the selective control, inhibition or eradication of weeds and other undesirable vegetation in citrus groves without detrimental effects on citrus trees. Bodies of water such as ditches, lakes, ponds, canals, rivers, reservoirs, and the like, can be treated with the present compounds or compositions containing the same as described above to control undesirable aquatic vegetation including floating, partially submerged, and totally submerged weeds. In these aquatic applications, the present compounds and compositions may be applied upon or below the surface of the water in amounts sufficient to yield therein in active compound concentration of about 1 to 1,000 and preferably 10 to 50 p.p.m. (parts per million), at which concentration the compound is for practical purposes water soluble and effective for periods ranging from a few minutes to several days. Applied as heavy emulsion particles, the present compositions sink to the bottom to control vegetation there. If desired, the present compositions may be especially prepared in such a state that they will sink to the bottom of the water and slowly release the active compound over an extended period of time. This may be accomplished, for example, by employing them as the active component in the amide-formaldehyde resinous pesticidal compositions disclosed and claimed in my copending application Serial No. 846,238.

The following examples are only illustrative of this invention and are not to be regarded as limitative. All parts and proportions referred to herein and in the appended claims are by weight unless otherwise indicated.

Example 1

A mixture of 1 mole equivalent of maleic hydrazide and 1.05 mole equivalents of methyl isocyanate is introduced into a high pressure glass reaction vessel large enough so that the mixture occupies less than 20% of the enclosed volume. The vessel is closed, heated gently in a water bath for about 20 minutes and then on a stream bath for about 4 to 3 hours. The resulting reaction product is separated by adding a small amount of hexanol to the reaction mixture and filtering off the desired product in the form of a crystalline, water insoluble, high melting precipitate which is a compound or a mixture of two or more of the compounds having the formulae described above wherein $R^1$ is methyl and $R^2$ is H.

Example 2

A mixture of 1 mole equivalent of maleic hydrazide and 1.05 mole equivalents of N,N-dimethyl carbamyl chloride is introduced into a reaction vessel equipped with stirrer and means for venting the evolved HCl. The reaction mixture is stirred, and after the temperature stops rising due to the exothermic reaction, the temperature is maintained at about 75° C. until no more HCl is evolved. A small amount of hexanol is added and the mixture chilled to precipitate the desired reaction product which is separated by filtration. The product is a compound or a mixture of two or more of the compounds having the formulae described above wherein $R^1$ and $R^2$ are each methyl.

Example 3

A solution of 0.75 gram of the product of Examples 1 or 2 in a minimum amount of dimethylformamide is thoroughly mixed into 14.25 grams of vermiculite (expanded mica) granules and the mixture dried. Soil in an open field is opened in rows 2 inches deep and 15 grams of active mixture are uniformly spread into three rows of 3 feet each, randomized between untreated control rows. This distribution amounts to about 2 lbs. of active carbamate compound per acre, although amounts ranging from less than ½ to over 4 lbs. per acre may be employed effectively. All the opened rows in the field are then covered with about an inch of soil, seed (various weeds, cotton, peanut, etc.) planted in the rows, and the seed in turn covered with soil. In contrast to the plants germinating and growing in the untreated rows, little or no plants are found to grow in the rows containing the described carbamate-containing composition.

Example 4

A liquid concentrate composed of 25% of the product of Examples 1 or 2 and 5% of isooctyl phenol decaethylene glycol ether (surface active agent) dissolved in xylene or other organic solvent for the said product, such as dimethyl formamide or sulfoxide, is emulsified in water and the emulsion sprayed on a field of mature cotton plants loaded with unopened bolls in a dosage of from ½ to 2 lbs. per acre. Visible injury to the leaves of the plants are apparent the next day, and 90 to 100% loss of leaves occurs within 7 days from the time of spraying. This defoliation facilitates mechanical harvesting of the cotton while maintaining minimization or elimination of staining of the subsequent yields of the cotton fiber by the green of the leaves.

Example 5

Twenty parts of the product of Examples 1 or 2 are thoroughly mixed with 2 parts of isooctyl phenol decaethylene glycol ether and 78 parts of attaclay to produce a wettable powder. When this powder is applied to cotton plants as described in Example 4, as such or in the form of an aqueous slurry, similar results are obtained.

This invention has been disclosed with respect to certain preferred embodiments, and various modifications and variations thereof, which are to be regarded as equivalents included within the scope of this invention, will become obvious to a person skilled in the art. Thus, in the above formulae, $R^1$ and $R^2$ may together represent the atoms necessary to complete a morpholine, piperidine, or other heterocycle. Alternatively, they may represent higher alkyl or other radicals if a more water insoluble product is desired. On the other hand, to promote water dispersibility or increased solubility in water, the products of this invention may be employed in the form of their acid or quaternary ammonium salts.

I claim:
1. The reaction product of
   A. 1 mole of maleic hydrazide with
   B. 1 mole of a compound having a formulae selected from the group consisting of
   (1) $O=C=N-R^1$ and
   (2) $Cl-OC-NR^1R^2$, wherein
      (a) $R^1$ is lower alkyl of 1 to 4 carbon atoms and
      (b) $R^2$ is selected from the group consisting of H and lower alkyl of 1 to 4 carbon atoms.
2. The reaction product of 1 mole of maleic hydrazide with 1 mole of methyl isocyanate.
3. The reaction product of 1 mole of maleic hydrazide with 1 mole of N,N-dimethyl carbamyl chloride.

References Cited by the Examiner
UNITED STATES PATENTS

| | | | |
|---|---|---|---|
| 2,785,102 | 3/1957 | Ligett et al. | 167—33 |
| 2,805,223 | 9/1957 | Hultquist | 260—250 |
| 2,837,527 | 6/1958 | Carnahan | 260—250 X |
| 2,938,902 | 5/1960 | Brevil | 260—250 |
| 2,959,475 | 11/1960 | Luckenbaugh | 71—2.5 |
| 3,097,944 | 7/1963 | Riddell et al. | 71—2.5 |

NICHOLAS S. RIZZO, *Primary Examiner.*

JULIAN S. LEVITT, *Examiner.*